(12) United States Patent
VanderHeiden (10) Patent No.: US 11,285,457 B2
(45) Date of Patent: Mar. 29, 2022

(54) ABSORBENT MATERIAL COMPOSITION, MANUFACTURE, AND METHOD OF USE

(71) Applicant: Timothy J. VanderHeiden, Chico, CA (US)

(72) Inventor: Timothy J. VanderHeiden, Chico, CA (US)

(*) Notice: Subject to any disclaimer, the term of this patent is extended or adjusted under 35 U.S.C. 154(b) by 348 days.

(21) Appl. No.: 16/532,244

(22) Filed: Aug. 5, 2019

(65) Prior Publication Data

US 2020/0038836 A1 Feb. 6, 2020

Related U.S. Application Data

(60) Provisional application No. 62/714,568, filed on Aug. 3, 2018.

(51) Int. Cl.
| | |
|---|---|
| *B01J 20/26* | (2006.01) |
| *B01J 20/04* | (2006.01) |
| *B01J 20/28* | (2006.01) |
| *C02F 1/28* | (2006.01) |
| *B08B 7/00* | (2006.01) |
| *E02B 15/10* | (2006.01) |
| *C02F 101/32* | (2006.01) |
| *C02F 101/34* | (2006.01) |
| *C02F 103/00* | (2006.01) |
| *E02B 15/04* | (2006.01) |

(52) U.S. Cl.
CPC .......... *B01J 20/264* (2013.01); *B01J 20/043* (2013.01); *B01J 20/2805* (2013.01); *B08B 7/0014* (2013.01); *C02F 1/288* (2013.01); *C02F 1/281* (2013.01); *C02F 1/285* (2013.01); *C02F 2101/32* (2013.01); *C02F 2101/34* (2013.01); *C02F 2103/007* (2013.01); *E02B 15/045* (2013.01); *E02B 15/101* (2013.01)

(58) Field of Classification Search
CPC .... B01J 20/043; B01J 20/264; B01J 20/2805; B08B 7/0014; C02F 1/281; C02F 1/285; C02F 1/288; C02F 1/40; C02F 2101/32; C02F 2101/34; C02F 2103/007; E02B 15/045; E02B 15/06; E02B 15/101; Y02A 20/204
See application file for complete search history.

(56) References Cited

U.S. PATENT DOCUMENTS

| | | | | |
|---|---|---|---|---|
| 2002/0168227 | A1* | 11/2002 | Rubin, Jr. | E02B 3/127 405/17 |
| 2011/0108472 | A1* | 5/2011 | Kania | A01G 31/02 210/151 |
| 2011/0280660 | A1* | 11/2011 | Bahukudumbi | C02F 1/681 405/63 |

* cited by examiner

*Primary Examiner* — Dirk R Bass
(74) *Attorney, Agent, or Firm* — Dergosits & Noah LLP (57) ABSTRACT

A method for absorbing liquids, such as liquid hydrocarbons, includes applying recycled carpet material to the liquid. The recycled carpet material is prepared by shredding carpet and removing fibers from the shredded carpet to obtain carpet backing material. The carpet backing material may be further treated to remove fibers. The carpet backing material is then applied to the liquid.

23 Claims, 3 Drawing Sheets

ABSORBENT MATERIAL COMPOSITION, MANUFACTURE, AND METHOD OF USE

CROSS-REFERENCE TO RELATED CASES

The present application claims priority to U.S. Provisional Patent Application No. 62/714,568, entitled "ABSORBENT MATERIAL: COMPOSITION, MANUFACTURE, AND USE," filed on Aug. 3, 2018, which is incorporated by reference.

TECHNICAL FIELD

The present subject matter relates to the field of absorbents and more particularly to materials, apparatus, and methods for absorbing chemical spills.

BACKGROUND

A leading oil-absorbing product is diatomaceous earth. However, silicate may account for 80-90% of diatomaceous earth and crystalline silicate is a potential cause of cancer. For example, OSHA has recently released guidelines for concrete saw cutting and other various forms of work that produce crystalline silicate. Thus, there is a need for a safer oil-absorbing material.

BRIEF DESCRIPTION OF THE DRAWINGS

The embodiments are illustrated by way of example and not limitation in the figures of the accompanying drawings, in which like references indicate similar elements, and in which.

DETAILED DESCRIPTION

The disclosed subject matter provides a use for a recycled product in consumer and industrial settings—the recovery of spilled oil, petroleum products, and hydrocarbon product derivatives for use in consumer and industrial settings. The motivation for this is to provide a superior "green" product offering an environmentally sound solution to industrial and consumer spills of petroleum based products that reduces the impact on disposal of these hazardous materials in landfills.

While current products utilize sand, sawdust, diatomaceous earth, and clay-based products, the use of recycled waste carpet backing material (otherwise called "PC4") offers superior recovery of these contaminants as well as other industrial spill materials. It also offers a potentially environmentally friendly alternative to other similar products that are headed to the landfill after use. Typically, for petroleum and hydrocarbon products, when these materials are spilled, the traditional petroleum absorption products used are in nature of biological origin and primarily inorganic, i.e. diatomaceous earth. But because of the presence of styrene-butadiene rubber (SBR), PC4 has a significant organic component. It is thought that this may explain why PC4 provides a superior attractive absorption material for collection of hydrocarbon and petroleum products.

PC4 is a relatively new product produced from recycled carpets. Typically, carpets are sorted and segregated based on the type of carpet prior to the recycling processing of carpet. There are many types of carpets that get recycled, including but not limited to: nylon, polyester, wool, and cotton. Despite the use of wool and cotton, 99% of the carpets in the U.S. are made from synthetic fibers. Notwithstanding the type of fiber, a commonality between all these types is the backing component material. The recycling of the backing components results in a general "universal" type of PC4. The material make-up of PC4 varies with the age of the carpet and location, however PC4 is composed of mostly of calcium carbonate and other trace organic elements.

Recent advancements in carpet processing have realized a substantial technological improvement in the production and separation of various by-products of waste carpet. The separation and bifurcation of waste carpet materials results in the production of several new products that offer a new set of post-consumer raw materials. One such material is PC4. It is estimated that all recycled carpet produces a type of PC4, with $CaCO_3$ and other bi-particles being the bulk of this material, which includes SBR and other trace materials.

The type of machinery that deconstructs carpet is often a Rotary Impact Separator (RIS) where carpet is shredded and classified by material and weight where the waste PC4 is created. After the carpet is shredded, the shredded fibers are further broken down and partially removed. The remaining broken-down carpet material is further refined by capturing fibers. With the captured fibers removed, the remaining material is the waste carpet backing, which is known as PC4. This material is produced and classified producing various particle sizes. In other words, the material is continually processed so that there essentially nothing left but the backing of the carpet, which has the consistency of powder or sand, depending upon the screening or classification of the material. For example, the carpet particles are further decreased in size by (shredding or grinding or both) and after each decrease in size the fiber is separated from the carpet backing, and this process is repeated.

The particle size of this material varies (often it comes in particles of less than 0.25 mm, it also comes in particle sizes from 0.25 to 2.00 mm). One factor in the particle size is the age of the carpet—it is noted that recycling a relatively newer carpet produces a larger final particle size than an older carpet, given both receive the same recycling treatment. The various sizes of PC4 particles may be used to fill, e.g., oil and petroleum absorbent socks, bags, containers, and other porous material containment systems. The smaller particle sizes perform expertly in absorbent blankets. The larger particles perform extremely well when applied directly on the spill from the consumer use packaging container or bag. These materials also work well as a blended PC4 product mix of various particle sizes for petroleum and hydrocarbon material absorption. Analyses of exemplary PC4 samples at grain sizes of less than 0.25 mm, and from 0.25 mm to 2.0 mm, are appended to the end of this paper (TABLE 2, dated Jun. 25, 2018).

In the past several years there has been the recognition by governmental agencies that waste carpet has greatly impacted our landfills. In the United States over 4 billion pounds of waste carpet are sent to landfills each year. To create a more circular economy around the life of carpet this disclosure shows the repurposing of one waste stream by-product that comes from recycling carpet and that by-product is PC4.

As discussed, PC4 is oil absorbing. It may out-perform other products because it is mostly inorganic in nature yet still with a significant organic component—in comparison to competitive products, which tend to be primarily inorganic materials. One other feature of this new use of PC4 is that can be used to pick up petroleum and hydrocarbon-based products such as motor oil, anti-freeze, brake fluid, and other products, including hydrophobic liquids and hydrophilic liquids.

Generally, the recycled carpet has various fiber content, but, generally, no more than 40% (by weight) of the recycled carpet is made of carpet fiber materials (which include Nylon, PET, Wool, and other synthetic fibers). More usually, the fiber content is from 1% to 20% fiber.

The use of PC4 offers a heathier green alternative to typical oil absorbing products. Moreover, there is one other greater benefit to this new use that derives from the density of PC4. For example, using the same weight of diatomaceous earth and PC4, the PC4 performs equally to or better than the diatomaceous earth as measured by the volume absorbed. However, the PC4 is denser, and as tested the same weight requires on average 40% less volume than the diatomaceous earth, or approximately twice as well as diatomaceous earth. In comparison to Perlite, the PC4 required on average 20% less volume to absorb the same amount of liquid. Since all of this material must be disposed of under EPA guidelines, using PC4 will reduce the volume in EPA regulated landfills. This translates to the industrial user using less volume of waste material on site, which is charged or expensed by volume at the reclamation location—typically a fifty-five gallon drum is picked up at the construction site, or industrial yard or auto shop. Thus, the 40% reduction in volume offers an on average 40% saving in disposal fees for the customer.

Uses of PC4 in this disclosure focus on utilizing PC4 (recycled carpet backing material) for industrial applications to be sold in commercial, municipal and governmental marketplaces.

Using PC4 to absorb spills provides the potential to capture millions of pounds of waste carpet material as a retail product for commercial and governmental Tier II product(s) utilized every day in commercial and public agency markets throughout the United States. Because PC4 has higher material density and superior absorption properties compared to diatomaceous earth and other clay absorbent products, using PC4 in this way may very well reduce landfill need by replacing other alternative oil-infused products. We have tested multiple consumer and industrial product materials for absorption, odor reduction and retention of material performance against our various PC4 material particle sizes and in all instances the PC4 outperforms the dozens of competitive products tested. PC4 has the potential to replace existing, bulkier products that are currently headed to treatment plants and facilities for proper disposal under EPA and environmental regulations.

In the past several years, there has been recognition by governmental agencies that waste carpet has greatly impacted landfills. In California alone, an estimated 390,000,000 lbs. of waste carpet are sent to landfills each year, representing a substantial amount of PC4 available to be reclaimed for consumer usage.

Presently, there are limited markets for PC4, and with increased carpet recycling facilities coming online, the volume of PC4 is going to continue to increase. There have been numerous test projects for the use of PC4, e.g., as an additive in rubber molded products, an additive for concrete, soil amendment for agricultural and water filtration projects.

There is presently not enough market demand to satisfy the continuing supply of this recycled by-product. The proposed uses disclosed in the application may favorably tip the scales for a sustainable and robust market supply and demand utilizing PC4 at the increased volume that will be produced in California. Thus, this disclosure proposes uses of PC4 that are sustainable for many years into the future.

The focus of products in this disclosure is directed at using PC4 for retail and industrial markets—the marketing of filtered (screened) PC4 that is private-labeled for consumers, commercial business enterprises, and governmental agencies.

Improvements in carpet processing have realized a substantial technological advancement in the production and separation of various by-products of waste carpet. The separation and bifurcation of waste carpet materials has resulted in the creation of several new products that present a new set of post-consumer raw materials. PC4 is one of these materials, with $CaCO_3$ comprising the bulk part of this material.

Appended to the end of this description are analyses of PC4 from Jul. 3, 2016 (TABLE 1), Jun. 25, 2018 (TABLE 2), May 6, 2016 (TABLE 3), and Apr. 29, 2016 (TABLE 4). It is estimated that more than 40% of all recycled carpet produces PC4, this material being mostly $CaCo_3$ as shown in TABLES 1-4.

This disclosure describes the use of waste carpet PC4 material in a product line. The product line offers, to the retail and municipality markets, a recycled product for the recovery of spilled oil and petroleum product in consumer and industrial settings.

The motivation for this product line is to provide a superior and environmentally progressive solution to industrial and consumer spills of petroleum products in the home or the workplace. This Tier II product is further defined below.

The discovery of this unique material application was realized after a hydraulic spill in one of our facilities—from a leak in one of the hydraulic hoses on one of our production lines. PC4, on-hand being tested as an additive in molded rubber products, was used to absorb the spilled hydraulic fluid. It was realized that PC4 out-performed the industrial "sock" products that were also used.

Subsequently, PC4 was tested against every known product on the market for this application—these included: clay, sawdust, kitty litter, and diatomaceous earth. These further included oil-absorbent material from various online stores, and purchased competitive products sold by several "big box" auto-supply retail outlets. The PC4 was tested with several types of petroleum and auto products. These included: motor oil, transmission fluid, hydraulic oil, and brake Fluid. The testing methodology was straightforward: the same amount of each material was used to test these products by placement in consistent volume containers and mixed them all for an equal amount of time.

It was found, through testing of over thirteen products, that the PC4 out-performed all these other products in the absorption and retention of the various compounds. While one product matched the performance results of the PC4, this material was more expensive than the typical diatomaceous earth products. There are other products sold for oil absorption including silicate, sawdust, and clay. There were tested as well, with unremarkable results.

The highest volume product sold for the purpose of petroleum recovery is diatomaceous earth-type material. Numerous blind absorption tests were conducted utilizing PC4, and it was found consistently that PC4 outperformed the diatomaceous earth and other competitive products offered in the national marketplace for industrial oil and petroleum absorption solutions.

In this testing, the optimum result was the complete absorption of the contaminant used, and the elimination of any residue left after the mixing process. All mixing was done at the same rate and speed for all samples.

A surprising result was that this PC4 material is truly sustainable. After the testing was performed, it was found that by pouring water into a container with the PC4 and absorbed contaminant, the contaminant was released and migrated to the top of the water surface, where the contaminant could be recovered with a small oil absorbent "sock." After this the wet PC4 material was left to dry out—it could then be used repeatedly as an oil or petroleum absorption product. Thus, PC4 is a truly sustainable product. Furthermore, PC4 has been shown to retain absorbed material better than a competing product. A competing product using diatomaceous earth, recycled paper, and perlite as the absorbing material was found to release liquid it had absorbed onto supporting cardboard layers after having been left on the cardboard layers for a period of time. In contrast, a similar product using PC4 did not release the liquid it had absorbed onto supporting cardboard layers under similar circumstances.

Subsequently, we provided various auto repair shops (the end user of these products) samples of our screened PC4 for the purposes of testing. In every instance, PC4 was reported to perform as well or better than the products currently used. Generally, PC4 as received from the recycling facilities has a finer particle size than diatomaceous earth and clay products and there was a concern that PC4 would more difficult to apply on spills. It was determined that this PC4 material collected and stored similarly as other competitive products, and performed equally to or better than the products currently in use. The finer particle size actually performed better, especially where there were minor indentations and cracks in the substrate because it was able to capture what larger particle size products could not.

Ultimately, it was determined it took less PC4 material to recover spilled petroleum products than many of the competitive products. This has a substantial impact on the disposal of this type of product under EPA regulations, discussed further below.

The tested competitive materials ranged in cost from approximately $0.19 per pound to $0.69 per pound at the retail (bulk) level. PC4 is denser than these competitive products and will therefore take up less retail counter space, while performing at a greater level than other competitive products.

It is recognized that L.A. Fiber, Inc., in the Los Angeles area, and Clear, Inc. in Northern California, are currently the larger producers of PC4. However, it is anticipated that other companies will come online in California and add to the production of PC4.

The life cycle of PC4 is expected to follow the same trajectory as all other oil-absorbent materials produced in the US. There are regulated facilities that capture and retain these oil-impacted products and dispose of them responsibly according to EPA standards and regulations. One unique positive feature of the disclosed uses of PC4 is that, because of the denser and finer particle size and the fact it takes less PC4 by volume to capture petroleum spills, the use of PC4 has the potential to reduce the national volume of materials going to regulated disposal sites. Moreover, the end user may have less volume to be picked up each week at their workplace or industrial setting.

The need for oil-absorbent materials extends far beyond retail markets. Large industrial and agricultural corporations, federal, state and local municipalities, including fire and police departments, state emergency response agencies and federal and governmental agencies, including the various military branches of the armed forces, also require the use of oil absorption materials.

In an embodiment, PC4 may be used to absorb various spilled liquids, such as water and other common industrial substances.

Generally, the backing has three main components: limestone, SBR, and residual short fiber. Limestone is a mixture of about 80% to 90% calcium carbonate ($CaCO_3$) and 10% to 20% magnesium carbonate (MgCO3). In other words, limestone is not all calcium carbonate. The data for these samples (Tables 1-4) show a Mg to Ca ratio of about 1 to 10 (the ratios range from 1 to 8, to 1 to 14), consistent with limestone composition. There are also "percent levels" of other elements including, e.g., aluminum, iron, and sodium.

The "glue" used in carpet is about 20% by weight SBR and about 80% by weight limestone. If there were no fiber in the PC4, the maximum limestone fraction would be 80%. Thus, when there is residual short fiber in the PC4, the amount of limestone is decreased.

Carbon in SBR and carbon in the fiber is considered organic carbon. Fiber is nominally a mixture of PET and polypropylene.

Carbonate carbon ($CO_3$) is considered inorganic carbon. Total carbon=organic carbon+inorganic carbon. Standard lab practice used in the analyses below is to measure total carbon and organic carbon, then calculate inorganic carbon by the difference. So, measurement errors "accumulate" in the inorganic carbon number. An estimate is that the inorganic carbon values are each accurate to within +/−1%. With that size error band, 7% and 9% can be considered approximately the same value. Because of the weighting factors in the calculations, a small difference in inorganic carbon can lead to a big difference in calcium carbonate levels. Limestone is only approximately 11% carbon.

The following information applies to the interpretation of the Jun. 25, 2018 analysis. All of the values are parts per million by weight, not volume. The following calculations assume that: a) The inorganic carbon calculation is accurate; b) all the inorganic carbon is carbonate; and c) all the carbonate is reacted with calcium (not magnesium or sodium).

| Fine Fraction | Coarse Fraction |
| --- | --- |
| 9.71% inorganic carbon | 7.30% inorganic carbon |
| 48.5% inorganic carbonate | 36.5% inorganic carbonate |
| 32.3% calcium required to react w/ carbonate | 24.3% calcium required to react w/ carbonate |
| 80.9% calcium carbonate | 60.8% calcium carbonate |

From these example calculations, it can be seen that a very small difference in inorganic carbon (7.3% vs 9.7%) leads to a large difference in calculated calcium carbonate percentage.

Figure 1:
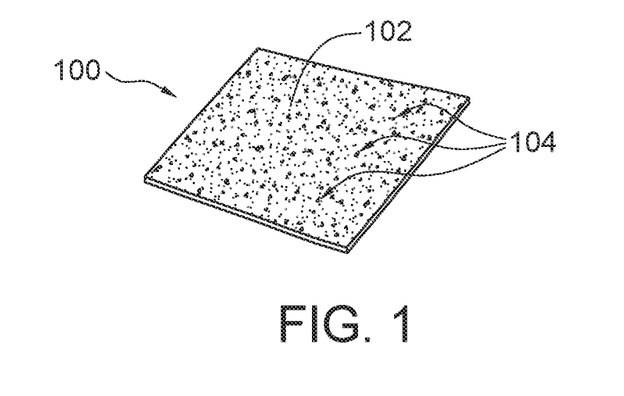
FIG. 1 is a perspective view of an absorbent pad according to an embodiment.

FIG. 1 is a perspective view of an absorbent pad 100 according to an embodiment. In FIG. 1, absorbent pad 100 includes a porous envelope 102 that has been filled with a layer of PC4 104. In an embodiment, the layer may be 24"×24"×1", however the dimensions are arbitrary. The dimensions of porous envelope 102 may be varied to provide a variety of pads, each pad suitable for a different sized spill. In an embodiment, porous envelope 102 is stitched or "quilted" after the addition of PC4 to maintain the distribution of PC4. In an embodiment, absorbent pad 100 may be constructed of a PC4 with a binding agent that allows liquids to access and be absorbed by the PC4. In an embodiment, absorbent pad 100 may be another material that has been impregnated with PC4. For example, the interstitial spaces of a sponge may be filled with PC4 and retained with a porous covering or other type of exterior layer. In embodiments, absorbent pad 100 may be placed on top of a spill, the PC4 absorbing the spill through porous envelope 102 or otherwise on contact.

Figure 2:
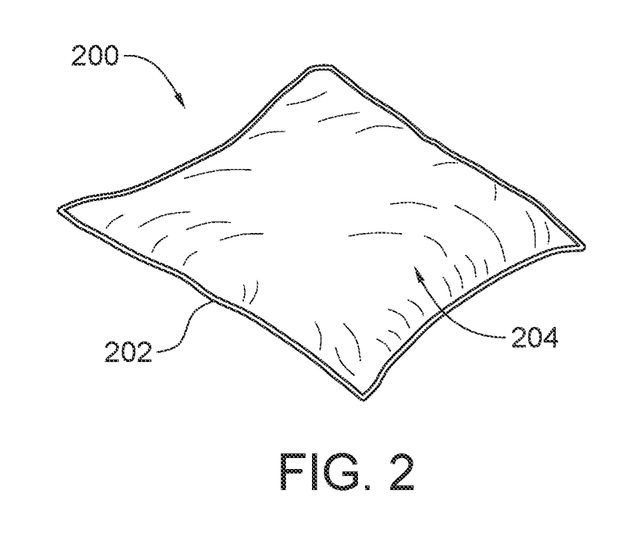
FIG. 2 is a perspective view of an absorbent pillow according to an embodiment.

FIG. 2 is a perspective view of an absorbent pillow 200 according to an embodiment. In FIG. 2, absorbent pillow 200 includes a porous bag 202 that has been filled with a volume of PC4 204. In an embodiment, pillow 200 may be 24"×24"×6", however the dimensions are arbitrary. The dimensions of porous bag 202 may be varied to provide a variety of pillows, each pillow with a surface area and volume of PC4 suitable for a different sized spill. In embodiments, absorbent pillow 200 may be placed on top of a spill, the PC4 absorbing the spill through porous envelope 202 or otherwise on contact. Absorbent pillow 200 may also be stacked about a spill to encompass the spill and prevent it from spreading.

Figure 3A:
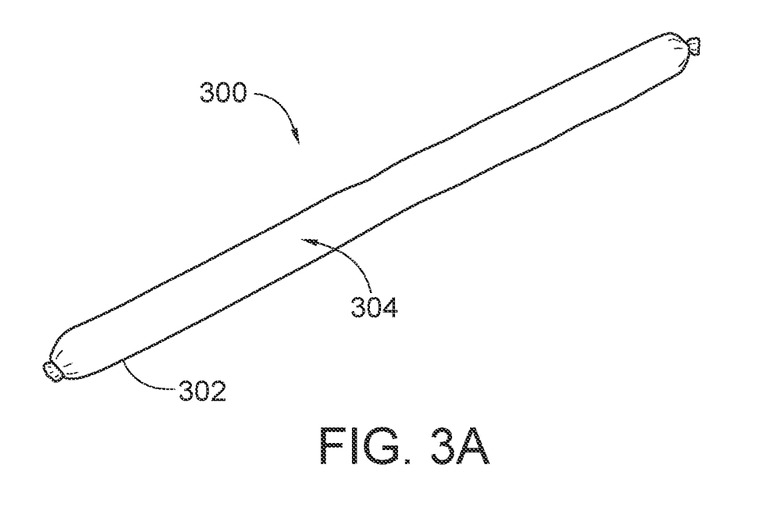
FIG. 3A and FIG. 3B are perspective views of an absorbent sock according to an embodiment.
Figure 3B:
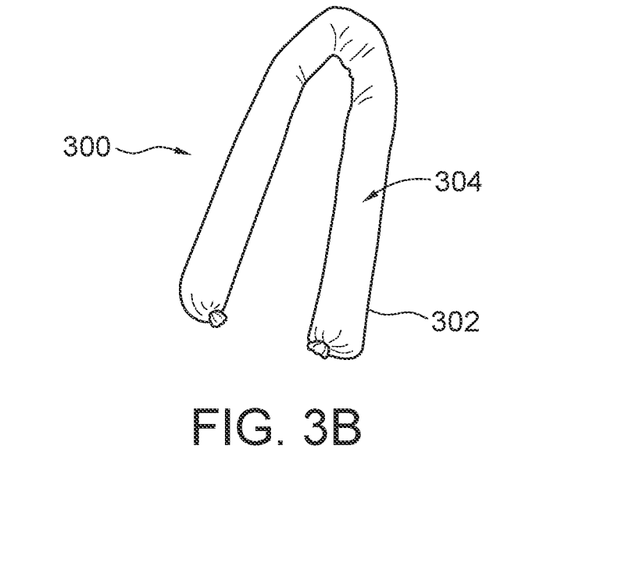

FIG. 3A and FIG. 3B are perspective views of an absorbent sock 300 according to an embodiment. In FIG. 3A, absorbent sock 300 includes a porous tube 302 filled with PC4 304 and sealed at both ends. In an embodiment, sock 300 may have a diameter of 3" and a length of 5', however the dimensions are arbitrary. The dimensions of porous tube 302 may be varied to provide a variety of socks, each sock with a surface area and volume of PC4 suitable for a different sized spill. FIG. 3B illustrates that absorbent sock 300 may be bendable, e.g., to be shaped to encompass a spill. Absorbent sock 300 may also be stacked about a spill to encompass the spill and prevent it from spreading.

Figure 4:
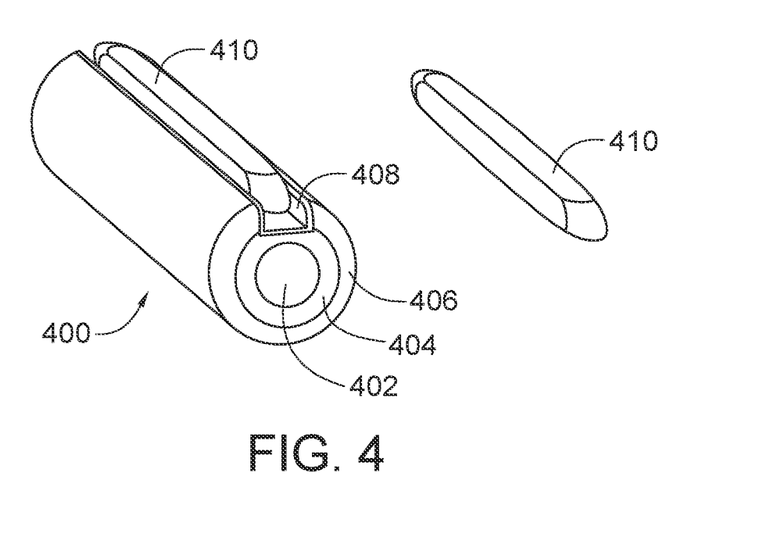
FIG. 4 is a perspective view of an absorbent float according to an embodiment.

FIG. 4 is a perspective view of an absorbent float 400 according to an embodiment. Absorbent float 400 uses PC4 to contain and absorb spilled chemicals, such as hydrocarbon fluids where, e.g., the spill is in a body of water. In the embodiment, the addition of an absorbent sock 410 results in absorbent float 400 providing an effective floating barrier as well as actually absorbing part of the spill. In fact, the addition of the absorbent float 410 results in absorbent float 400 containing a spill more effectively that just a floating barrier without any absorption component. In FIG. 4, absorbent float 400 includes an inner float filler 402, a first float filler 404, a second float filler 406, a foam edge 408, and absorbent float 410.

Inner float filler 402 may be a closed cell foam floatation material that is of higher density than the material used in first float filler 404 or second float filler 406. Inner float filler 402, being denser, serves as a ballast for absorbent float 400. First float filler 404 may be a closed cell foam floatation material that is of lighter density than the material used in inner float filler 402. First float filler 404 serves to provide floatation and structure for absorbent float 410. Second float filler 406 may also be a closed cell foam floatation material that is also of lighter density than the material of inner float 402. Second float filler 406 also serves to provide structure for absorbent float 400.

Foam edge 408 includes fiber hooks, e.g., the "hook" part of a hook and loop retention device, that engage the complementary part of the retention device to hold absorbent sock 410 in place. The use of a hook and loop retention system provides for the quick replacement of an absorbent sock 410.

Hydrocarbon absorbent sock 410 includes a porous housing filled with PC4. Absorbent sock 410 is dimensioned to be retained within the slot created by foam edge 408. As such, in the embodiment shown, absorbent sock 410 has a rectangular cross-section to mirror the slot. In other embodiments, absorbent sock 410 and foam edge 408 are envisioned with different cross-sections. In any of these embodiments, absorbent sock 410 inserts into the slot at the top of absorbent float 400 and absorbs hydrocarbon spillage that may splash over the top of the floatation device in water that is not still or is otherwise disturbed. In an embodiment, absorbent sock 410 is replaceable, e.g., when saturated with absorbed liquid hydrocarbons.

In an embodiment, an absorbent float may have foam float fillers 402, 404, 406 of different densities chosen and dimensioned to maintain absorbent sock 410 above a waterline of absorbent float 400. For example, denser foam, such as that used in inner float filler 402, may be positioned relatively toward the bottom of the absorbent float to act as ballast (so that the cylindrical layers are parallel but no longer the coaxial layers shown in FIG. 4). In turn, lighter floatation foam fillers, such as that used in float filler 404 or 406, may be positioned more toward the upper part of the absorbent float, such that the center of gravity is below the center of buoyancy. As such, with absorbent sock 410 positioned above the lighter foam filler, the relative densities of the float fillers work to maintain absorbent sock above the waterline. In an embodiment, dense ballast foam is positioned at the bottom of absorbent float 400 with lighter floatation foam positioned above the dense ballast foam. In an embodiment, the different foam layers may be flat, with the dense foam ballast layer on the bottom.

Figure 5:
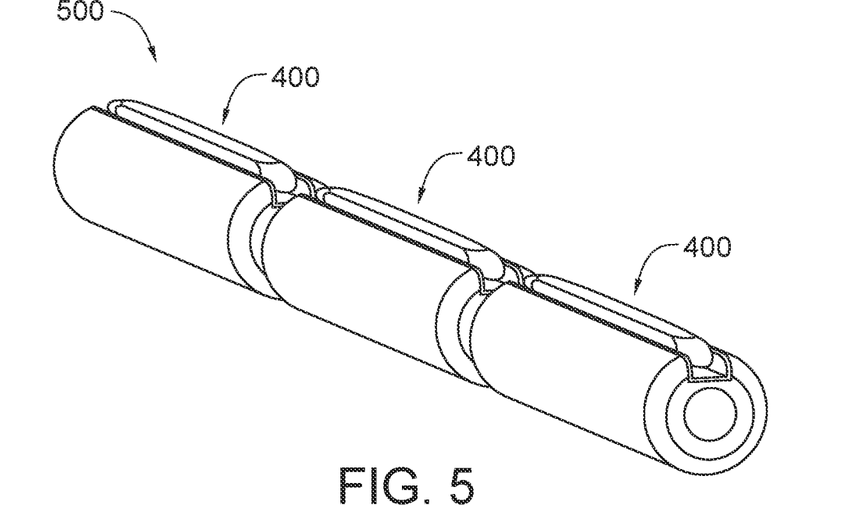
FIG. 5 is a perspective view of a chain of absorbent floats according to an embodiment.

FIG. 5 is a perspective view of a chain 500 of absorbent floats 400 according to an embodiment. In FIG. 5, three absorbent floats 400 are linked together using a flexible connection, e.g., webbing. In an embodiment, the flexible connection is continuous (e.g., a continuous flexible sheet) between the bottom and top of the space between adjacent absorbent floats 400 so that spillage may not escape through the crack between adjacent absorbent floats 400. In an embodiment, chain 500 may total 25 feet long and one or more chains 500 may be linked together to make longer barriers surround greater areas. Embodiments of chain 500 may be deployed around a spill on water (or land) in an effort to contain the spilled material.

TABLE 1

ANALYSES, Jul. 3, 2018, Method: nitric acid digestion, Material: Sifted PC4

| Elements | 18-183L-01 As Received | 18-183L-02 Ashed @ 500° C. |
|---|---|---|
| Aluminum | 2,600.81 | 12,646.40 |
| Arsenic | <0.50 | <0.50 |
| Barium | 125.24 | 190.75 |
| Boron | 37.01 | 37.57 |
| Cadmium | 0.13 | 0.51 |
| Calcium | 239,539.37 | 309,985.68 |
| Chromium | 1.32 | 3.68 |
| Cobalt | 1.82 | 4.49 |
| Copper | 7.99 | 9.03 |
| Iron | 1,289.17 | 2,021.75 |
| Lead | 2.91 | 6.89 |
| Lithium | 1.82 | 6.99 |
| Magnesium | 30,643.80 | 38,858.10 |
| Manganese | 87.98 | 114.53 |
| Mercury | <0.15 | <0.15 |
| Molybdenum | 4.94 | 17.33 |

TABLE 1-continued

ANALYSES, Jul. 3, 2018, Method: nitric acid digestion, Material: Sifted PC4

| Elements | 18-183L-01 As Received | 18-183L-02 Ashed @ 500° C. |
|---|---|---|
| Nickel | 1.96 | 2.38 |
| Phosphorus | 400.35 | 550.06 |
| Potassium | 751.23 | 1,686.58 |
| Selenium | <0.50 | <0.50 |
| Silicon | 666.63 | 2,765.95 |
| Silver | <0.10 | <0.10 |
| Sodium | 5,189.27 | 6,888.10 |
| Strontium | 257.59 | 335.92 |
| Sulfur | 1,989.92 | 2,500.83 |
| Tin | <5.00 | <5.00 |
| Titanium | 16.28 | 97.68 |
| Vanadium | 1.08 | 3.42 |
| Zinc | 60.00 | 88.69 |
| Chloride | 854.31 | 1,450.82 |
| Elements expressed as mg/kilogram (parts per million). | | |
| Total Carbon | 22.184% | 10.115% |
| Organic Carbon | 12.913% | 0.436% |
| Inorganic Carbon | 9.271% | 9.679% |
| Calcium Carbonate based upon: | | |
| Calcium | 59.88% | 77.50% |
| Inorganic Carbon | 77.26% | 80.66% |
| Dolomitic Lime Based upon: | | |
| Calcium | 110.21% | 142.63% |
| Magnesium | 23.25% | 29.48% |
| Inorganic Carbon | 71.32% | 74.46% |
| Magnesium Carbonate Based upon: | | |
| Magnesium | 10.63% | 13.48% |
| Inorganic Carbon | 65.29% | 68.16% |
| Acid Insoluble Materials | 21.80% | 9.20% |
| Ash Content @ 500 C. (LOI) | 74.88% | |
| pH (1:50 solution) | 7.94 | 10.88 |

TABLE 2

ANALYSES, Jun. 25, 2018, Method: nitric acid digestion

| Elements | 18-172L-03 Calcium Carbonate & Latex Less Than 0.25 mm | 18-172L-04 Calcium Carbonate & Latex 0.25 mm to 2.0 mm |
|---|---|---|
| Aluminum | 2,037.23 | 2,028.22 |
| Arsenic | <0.50 | <0.50 |
| Barium | 176.19 | 165.84 |
| Boron | 24.82 | 19.05 |
| Cadmium | <0.10 | <0.10 |
| Calcium | 231,499.53 | 248,022.71 |
| Chromium | 1.04 | 0.81 |
| Cobalt | 2.32 | 2.68 |
| Copper | 3.20 | 2.06 |
| Iron | 1989.79 | 2,196.11 |
| Lead | 0.81 | 0.72 |
| Lithium | 0.87 | 0.85 |
| Magnesium | 23,001.30 | 25,585.40 |
| Manganese | 181.38 | 180.39 |
| Mercury | <0.15 | <0.15 |
| Molybdenum | 3.22 | 3.29 |
| Nickel | 1.23 | 1.29 |
| Phosphorus | 416.85 | 404.40 |
| Potassium | 440.52 | 383.52 |
| Selenium | <0.50 | <0.50 |
| Silicon | 438.73 | 375.64 |
| Silver | <0.10 | <0.10 |
| Sodium | 3,029.54 | 2,295.38 |
| Strontium | 514.08 | 475.13 |
| Sulfur | 2,076.82 | 1618.10 |
| Tin | <5.00 | <5.00 |
| Titanium | 9.28 | 6.74 |
| Vanadium | <0.05 | <0.05 |
| Zinc | 27.78 | 16.93 |
| Chloride | 744.43 | 518.18 |
| Elements expressed as mg/kilogram (parts per million). | | |
| Total Carbon | 26.69% | 23.75% |
| Organic Carbon | 16.98% | 16.45% |
| Inorganic Carbon | 9.71% | 7.30% |
| Calcium Carbonate based upon: | | |
| Calcium | 57.9% | 62.0% |
| Inorganic Carbon | 80.9% | 60.8% |
| Acid Insoluble Materials | 27.2% | 24.6% |

TABLE 3

ANALYSES, May 6, 2016, Method: nitric acid digestion, Material: Section #7 Apr. 28, 2016

| Elements | 16-127L-02 As Received | 16-127L-01 Ashed @ 500° C. |
|---|---|---|
| Aluminum | 3,723.02 | 8,490.92 |
| Arsenic | <0.50 | <0.50 |
| Barium | 90.49 | 128.91 |
| Boron | <0.10 | <0.10 |
| Cadmium | 1.01 | 1.16 |
| Calcium | 245,789.44 | 311,315.19 |
| Chromium | 1.19 | 2.31 |
| Cobalt | 1.17 | 1.84 |
| Copper | 1.09 | 2.01 |
| Iron | 1,624.31 | 1,953.05 |
| Lead | 1.11 | <0.30 |
| Lithium | 209.54 | 261.31 |
| Magnesium | 17,437.73 | 21,627.05 |
| Manganese | 92.57 | 110.64 |
| Mercury | <0.15 | <0.15 |
| Molybdenum | 0.83 | 1.14 |
| Nickel | 1.38 | 3.37 |
| Phosphorus | 398.34 | 514.85 |
| Potassium | 1,111.16 | 1,690.82 |
| Selenium | <0.50 | <0.50 |
| Silicon | 216.15 | 710.11 |
| Silver | <0.10 | <0.10 |
| Sodium | 4,758.02 | 4,410.83 |
| Strontium | 275.93 | 341.49 |
| Sulfur | 1,526.23 | 1,633.23 |
| Tin | <5.00 | <5.00 |
| Titanium | 13.11 | 31.10 |
| Vanadium | 191.97 | 430.68 |
| Zinc | 43.55 | 47.97 |
| Chloride | 1,043.77 | 1,043.59 |
| Elements expressed as mg/kilogram (parts per million). | | |
| Total Carbon | | 10.551% |
| Organic Carbon | 14.386% | 1.189% |
| Inorganic Carbon | 10.412% | 9.362% |
| Calcium Carbonate based upon: | | |
| Calcium | 61.45% | 77.83% |
| Inorganic Carbon | 86.77% | 78.01% |

TABLE 3-continued

ANALYSES, May 6, 2016, Method: nitric acid digestion, Material: Section #7 Apr. 28, 2016

| Elements | 16-127L-02 As Received | 16-127L-01 Ashed @ 500° C. |
|---|---|---|
| Dolomitic Lime Based upon: | | |
| Calcium | 113.09% | 143.24% |
| Magnesium | 13.23% | 16.41% |
| Inorganic Carbon | 80.09% | 72.01% |
| Magnesium Carbonate Based upon: | | |
| Magnesium | 6.05% | 7.50% |
| Inorganic Carbon | 73.32% | 65.93% |
| Acid Insoluble Materials | 23.40% | 7.00% |
| Ash Content @ 500 C. (LOI) | 79.28% | |
| pH (1:50 solution) | 8.88 | 10.15 |

TABLE 4

ANALYSES, Apr. 29, 2016, Method: nitric acid digestion, Material:

| Elements | 16-119L-01 Section 2 | 16-119L-02 Section 4 | 16-119L-03 Section 6 | 16-119L-04 Section 8 |
|---|---|---|---|---|
| Aluminum | 4,964.88 | 5,331.31 | 3,887.19 | 4,828.26 |
| Arsenic | <0.50 | <0.50 | <0.50 | <0.50 |
| Barium | 265.68 | 232.68 | 248.36 | 212.48 |
| Boron | 4.03 | 0.61 | 3.55 | 1.68 |
| Cadmium | 0.83 | 0.66 | 0.69 | 0.65 |
| Calcium | 158,726.47 | 153,195.42 | 156,510.86 | 151,431.61 |
| Chromium | 3.16 | 2.68 | 3.63 | 2.94 |
| Cobalt | 3.20 | 3.49 | 3.27 | 3.81 |
| Copper | 3.01 | 2.12 | 2.81 | 2.74 |
| Iron | 1,166.93 | 1,103.52 | 1,088.12 | 1,061.48 |
| Lead | 0.57 | <0.30 | 1.74 | <0.30 |
| Lithium | 117.22 | 111.22 | 114.32 | 107.05 |
| Magnesium | 12,444.86 | 11,979.36 | 11,956.75 | 11,288.56 |
| Manganese | 69.77 | 66.52 | 67.20 | 62.78 |
| Mercury | <0.15 | <0.15 | <0.15 | <0.15 |
| Molybdenum | 1.49 | 1.96 | 1.18 | 1.51 |
| Nickel | 1.37 | 1.12 | 0.86 | 0.96 |
| Phosphorus | 435.50 | 399.17 | 420.55 | 380.00 |
| Potassium | 891.23 | 700.38 | 790.23 | 773.12 |
| Selenium | <0.50 | <0.50 | <0.50 | <0.50 |
| Silicon | 161.30 | 120.74 | 210.99 | 150.20 |
| Silver | <0.10 | <0.10 | <0.10 | <0.10 |
| Sodium | 3,632.86 | 3,284.13 | 3,486.78 | 3,261.22 |
| Strontium | 193.34 | 182.84 | 184.61 | 169.89 |
| Sulfur | 1,567.86 | 1,332.12 | 1,338.63 | 1,305.45 |
| Tin | 50.11 | 28.96 | 24.26 | 20.94 |
| Titanium | 15.57 | 13.97 | 12.78 | 13.92 |
| Vanadium | 253.06 | 272.75 | 203.05 | 251.60 |
| Zinc | 34.60 | 29.98 | 30.93 | 30.03 |
| Chloride | 411.66 | 241.64 | 551.14 | 475.25 |
| Elements expressed as mg/kilogram (parts per million) on an as received basis. | | | | |
| Total Carbon | 37.733% | 40.508% | 37.412% | 43.532% |
| Organic Carbon | 30.394% | 33.470% | 31.253% | 37.140% |
| Inorganic Carbon | 7.339% | 7.037% | 6.159% | 6.392% |
| Calcium Carbonate based upon: | | | | |
| Calcium | 39.68% | 38.30% | 39.13% | 37.86% |
| Inorganic Carbon | 61.16% | 58.64% | 51.32% | 53.27% |
| Dolomitic Lime Based upon: | | | | |
| Calcium | 73.03% | 70.49% | 72.01% | 69.67% |
| Magnesium | 9.44% | 9.09% | 9.01% | 8.56% |
| Inorganic Carbon | 56.45% | 54.13% | 47.37% | 49.17% |
| Magnesium Carbonate Based upon: | | | | |
| Magnesium | 4.32% | 4.16% | 4.15% | 3.92% |
| Inorganic Carbon | 51.68% | 49.56% | 43.37% | 45.02% |
| Acid Insoluble Materials from Hotplate | 44.80% | 48.60% | 45.80% | 47.80% |
| Ash Content @ 500 C. (LOI) Acid Insoluble Materials post LOI | 49.16% | 47.82% | 51.22% | 47.30% |
| | 3.53% | 3.57% | 3.72% | 3.64% |

The following paragraphs contain enumerated embodiments.

1. A method for absorbing liquid comprising: applying a first volume of a recycled carpet material to a second volume of liquid, the first volume being less than a third volume of diatomaceous earth that would be required to absorb the second volume of liquid.

2. The method of embodiment 1, wherein the first volume is at least 40% less than the third volume.

3. The method of embodiment 1, wherein the liquid includes a liquid hydrocarbon.

4. The method of embodiment 1, wherein the recycled carpet material is prepared by: shredding carpet; and removing fibers from the shredded carpet to obtain the recycled carpet material.

5. The method of embodiment 4, wherein at least 60% of the recycled carpet material comprises limestone and styrene-butadiene rubber (SBR).

6. The method of embodiment 4, wherein at least 80% of the recycled carpet material comprises limestone and styrene-butadiene rubber (SBR).

7. The method of embodiment 1, wherein the recycled carpet material comprises PC4.

8. The method of embodiment 1, wherein the recycled carpet material comprises limestone and styrene-butadiene rubber (SBR).

9. The method of embodiment 1, wherein the recycled carpet material is encompassed by a porous material.

10. The method of embodiment 9, wherein the porous material comprises an elongate container affixed to an elongate float.

11. The method of embodiment 1, wherein the liquid comprises antifreeze products made from ethylene glycol or polyethylene glycol.

12. A method for absorbing liquid comprising: applying PC4 to the liquid.

13. The method of embodiment 12, wherein applying PC4 to the liquid comprises: applying a first volume of PC4 to a second volume of liquid, the first volume being less than a third volume of diatomaceous earth required to absorb the second volume of liquid.

14. The method of embodiment 12, wherein the first volume is at least 40% less than the third volume.

15. The method of embodiment 12, wherein the liquid includes a liquid hydrocarbon.

16. The method of embodiment 12, wherein the PC4 is prepared by: shredding carpet; and removing fibers from the shredded carpet to obtain PC4.

17. The method of embodiment 12, wherein the recycled carpet material is encompassed by a porous material.

18. The method of embodiment 12, wherein the porous material comprises an elongate container affixed to an elongate float.

19. The method of embodiment 12, wherein the liquid comprises antifreeze products made from ethylene glycol or polyethylene glycol.

20. A method for absorbing liquid comprising: applying a recycled carpet material to a liquid, the recycled carpet material prepared by: shredding carpet; and removing fibers from the shredded carpet to obtain the recycled carpet material.

21. The method of embodiment 20, wherein at least 60% of the recycled carpet material comprises limestone and styrene-butadiene rubber (SBR).

22. An apparatus comprising: a porous material; and an absorbent including at least one of: a recycled carpet material, PC4, or limestone and styrene-butadiene rubber (SBR), wherein the absorbent is encompassed by the porous material.

23. The apparatus of embodiment 22, wherein the absorbent is prepared by: shredding carpet; and removing fibers from the shredded carpet to obtain the recycled carpet material.

24. The apparatus of embodiment 22, wherein the absorbent and encompassing porous material form an elongate absorbing element, the apparatus further comprising a float, wherein the elongate absorbing element is attached to the float.

25. The apparatus of embodiment 24, wherein the float is cylindrical with a first axis with the elongate absorbing element attached to the float such that the elongate absorbing element is parallel to the first axis, the apparatus further comprising a ballast attached to the float, the ballast being denser than the float and positioned to create a center of mass of the apparatus that is below a center of buoyancy of the apparatus.

26. The apparatus of embodiment 24, comprising a plurality of elongate absorbing elements each attached to one float from a corresponding plurality of floats, wherein each of the plurality of floats are connected to create a chain of floats.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method for absorbing liquid comprising:
   a. Applying a first volume of a recycled carpet material to a second volume of liquid, the first volume being less than a third volume of diatomaceous earth that would be required to absorb the second volume of liquid, wherein the recycled carpet material is prepared by:
      i. Shredding carpet; and
      ii. Removing fibers from the shredded carpet to obtain the recycled carpet material.

2. The method of claim 1, wherein the first volume is at least 40% less than the third volume.

3. The method of claim 1, wherein the liquid includes a liquid hydrocarbon.

4. The method of claim 1, wherein at least 60% of the recycled carpet material comprises limestone and styrene-butadiene rubber (SBR).

5. The method of claim 1, wherein at least 80% of the recycled carpet material comprises limestone and styrene-butadiene rubber (SBR).

6. The method of claim 1, wherein the recycled carpet material comprises PC4.

7. The method of claim 1, wherein the recycled carpet material comprises limestone and styrene-butadiene rubber (SBR).

8. The method of claim 1, wherein the recycled carpet material is encompassed by a porous material.

9. The method of claim 8, wherein the porous material comprises an elongate container affixed to an elongate float.

10. The method of claim 1, wherein the liquid comprises antifreeze products made from ethylene glycol or polyethylene glycol.

11. A method of absorbing liquid comprising:
   a. Applying PC4 to the liquid, wherein the PC4 is prepared by:
      i. Shredding carpet; and
      ii. Removing fibers from the shredded carpet to obtain PC4.

12. The method of claim 11, wherein applying PC4 to the liquid comprises:
   a. applying a first volume of PC4 to a second volume of liquid, the first volume being less than a third volume of diatomaceous earth required to absorb the second volume of liquid.

13. The method of claim 11, wherein the first volume is at least 40% less than the third volume.

14. The method of claim 11, wherein the liquid includes a liquid hydrocarbon.

15. The method of claim 11, wherein the recycled carpet material is encompassed by a porous material.

16. The method of claim 11, wherein the porous material comprises an elongate container affixed to an elongate float.

17. The method of claim 12, wherein the liquid comprises antifreeze products made from ethylene glycol or polyethylene glycol.

18. A method for absorbing liquid comprising:
   a. applying a recycled carpet material to a liquid, the recycled carpet material prepared by:
      i. shredding carpet; and
      ii. removing fibers from the shredded carpet to obtain the recycled carpet material.

19. The method of claim 18, wherein at least 60% of the recycled carpet material comprises limestone and styrene-butadiene rubber (SBR).

20. An apparatus comprising:
   a. A porous material; and
   b. An absorbent including at least one of:
      i. A recycled carpet material,
      ii. PC4, or
      iii. Limestone and styrene-butadiene rubber (SBR),
   b. Wherein the absorbent is encompassed by the porous material and the absorbent is prepared by:
      i. Shredding carpet; and
      ii. Removing fibers from the shredded carpet to obtain the recycled carpet material.

21. The apparatus of claim 20, wherein the absorbent and encompassing porous material form an elongate absorbing element, the apparatus further comprising a float, wherein the elongate absorbing element is attached to the float.

22. The apparatus of claim 21, wherein the float is cylindrical with a first axis with the elongate absorbing element attached to the float such that the elongate absorbing element is parallel to the first axis, the apparatus further comprising a ballast attached to the float, the ballast being denser than the float and positioned to create a center of mass of the apparatus that is below a center of buoyancy of the apparatus.

23. The apparatus of claim 21, comprising a plurality of elongate absorbing elements each attached to one float from a corresponding plurality of floats, wherein each of the plurality of floats are connected to create a chain of floats.

* * * * *